United States Patent

[11] 3,607,777

| [72] | Inventors | Milton E. Winyall<br>Ellicott;<br>Ellsworth G. Acker, Baltimore, both of, Md. |
|---|---|---|
| [21] | Appl. No. | 737,816 |
| [22] | Filed | June 18, 1968 |
| [45] | Patented | Sept. 21, 1971 |
| [73] | Assignee | W. R. Grace & Co.<br>New York, N.Y. |

[54] PROCESS FOR PREPARING MICROSPHEROIDAL DESICCANT SILICA GEL
4 Claims, No Drawings

[52] U.S. Cl. ................................................ 252/317,
 23/182 R, 252/194, 252/451
[51] Int. Cl. .......................................... B01j 13/00,
 C01b 33/16, C09k 3/00
[50] Field of Search ............................................ 252/317,
 194, 451; 23/182

[56] References Cited
UNITED STATES PATENTS

| 3,070,426 | 12/1962 | Winyall | 23/182 |
| 3,375,201 | 3/1968 | Winyall | 252/451 X |

*Primary Examiner*—Richard D. Lovering
*Attorneys*—Arthur P. Savage and Kenneth E. Prince ABSTRACT: An aqueous alkali metal silicate solution is partially neutralized with a mineral acid until a pH of about 9.6–10.9 is reached. When a soft gel has formed, the mixture is vigorously agitated to obtain a fine slurry, and more mineral acid is added until a pH of about 0.5–3.0 is reached. The resultant slurry is then spray dried and washed. After drying at about 200° C., product particles of desiccant silica gel having average particle sizes ranging from 10 to 100 microns, a surface area of about 650–950 m.$^2$/g., and a pore volume of 0.35–0.8 cc./g. are obtained.

PROCESS FOR PREPARING MICROSPHEROIDAL DESICCANT SILICA GEL

This invention relates to a process for making silica gel. More specifically, this invention relates to a process for preparing fine sized spherical absorptive silica gel.

There is currently a large demand for finely divided absorbent silica gel for such applications as the drying of gases in a fluidized bed, and liquid drying where very high surface area of the desiccant is required. Heretofore, such finely divided silicas have been prepared by gelling a silica sol and grinding the resulting silica gel. This technique has several inherent disadvantages. The process is very time consuming in that the silica gel must be washed, dried, ground, and sized (e.g., screened). The oversized particles remaining from the sizing step must then be further ground and resized.

We have made the surprising discovery that by following the steps of the instant invention as taught herein, an absorbent silica gel having fine-sized spherical particles can be obtained without resorting to grinding. Further, said silica gel particles have a relatively narrow size distribution, and there is no necessity for sizing said particles.

It is therefore an object of this invention to provide a process for preparing silica gel.

It is a further object of this invention to prepare spherical fine sized adsorbent silica gel.

Another object of this invention is to provide a process for preparing fine sized silica gel, said process eliminating the need for grinding and sizing. In summary, this invention is a process for preparing fine-sized silica gel. The process comprises:

a. Reacting an aqueous solution of alkali metal silicate and an aqueous solution of mineral acid to form a silica hydrosol having a pH of about 9.6–10.9;

b. Permitting said hydrosol to gel and agitating said hydrogel to form an alkaline slurry of soft fine sized silica gel particles;

c. Reacting said alkaline slurry and an aqueous solution of mineral acid to obtain an acidic silica gel slurry having a pH of about 0.5–3.0;

d. Rapidly drying said acidic silica gel slurry to obtain dried silica gel particles having average particle sizes ranging from 10 to 80 microns; and e. Recovering said dried silica gel particles.

Normally prepared aqueous alkali metal silicate solutions are used in this invention. Preferably sodium silicate is dissolved in enough water to provide a solution which is about 5–22 percent silica by weight, although solutions outside this range are acceptable.

The acids contemplated herein are those inorganic acids commonly referred to by those skilled in the art as mineral acids. Among the acids encompassed by that term are sulfuric acid, hydrochloric acid (aqueous hydrogen chloride), nitric acid, and phosphoric acid. In a preferred embodiment of this invention, the aqueous solution of mineral acid is about 5–40 percent by weight solution of sulfuric acid.

Any suitable reaction means may be used to contain the reacting silicate and acid solutions, provided there is sufficient agitation to bring about thorough, rapid mixing of the reactants. Typical of such a reaction means is a stainless steel bucket provided with an air-driven stirrer.

Usually, the reactants are mixed by adding the aqueous acid to the stirred silicate solution. When enough acid has been added to bring the pH of the reaction mixture to a level of about 9.6–10.9 the acid addition is discontinued. While the sol is setting to a soft gel (usually about 1–10 minutes) the thus formed hydrogel is vigorously agitated to form a fine dispersion of slurry of hydrogel particles. Preferably, the agitation is rapid stirring, but other methods such as shaking and ultrasonic vibration are also contemplated.

When the alkaline hydrogel slurry has been agitated until uniform, more aqueous acid is added. The agitation is continued to assure rapid mixing and when the pH of the hydrogel slurry is at a level of about 0.5–3.0, the acid addition is stopped. To insure desicant properties, the pH should be less than about 3.0.

At this point the acidic hydrogel slurry must be rapidly dried. In this particular step slow or oven drying will not suffice. It has been found that in order to obtain adsorptive silica, the drying step should be accomplished in less than about 3 minutes. Preferably, the acidic silica hydrogel slurry is spray dried at an inlet temperature of about 250°–550° C. Such a procedure dries the slurry in about 1–5 seconds. After spray drying, the resulting silica gel particles are recovered and are found to have an average size of about 10–100 microns.

As used herein, the term "particle size" is to be construed as meaning average particle size. However, the distribution of particle size occurring in the silica gel of this invention is unusually narrow as is illustrated by example III.

The following examples are provided to further point out the various aspects of this invention. They are to serve merely in an illustrative capacity and are no way intended to limit the invention.

EXAMPLE I

To form an alkaline silica hydrosol about 3,000 ml. of about 6 percent aqueous sulfuric acid was poured into about 4,000 ml. of a stirred sodium silicate solution (about 20 percent $SiO_2$ and 6.2 percent $Na_2O$). The resultant hydrosol had a pH of about 10.7 and was allowed to set to a soft gel. The gel was broken up by stirring and formed into a slurry of finely divided gel particles. More aqueous acid (about 5,250 ml. of 7.1 percent sulfuric acid) was added to the slurry to form an acidic silica slurry having a pH of about 2.0. This slurry was spray dried at about 400° C. and then washed in aqueous sulfuric acid (pH = about 3.0) at about 60° C. Washing was complete in about 10 minutes. After oven drying at about 200° C., the resulting silica gel had the following properties:

| | |
|---|---|
| Average particle size | 35 microns |
| Surface area | 965 m²/g. |
| Pore volume | 0.75 cc/g. |
| $Na_2O$ | 0.009% |
| $SO_4$ | 0.02% |

The water-adsorptive capacity was measured at various relative humidities and the results are as follows:

| % Relative Humidity | % Moisture Adsorbed |
|---|---|
| 10 | 4.5 |
| 20 | 5.9 |
| 80 | 28.0 |

EXAMPLE II

About 334 g. of 7 percent aqueous sulfuric acid was poured into about 1,000 g. of a stirred sodium silicate solution containing about 8 percent silica. The resultant hydrosol has a pH of about 10.1 and in about 2 minutes the sol had set to a soft gel. The gel was broken up into a slurry of finely divided particles by rapid stirring and after stirring the alkaline slurry for about 15 minutes, enough 15 percent aqueous sulfuric acid was added to bring the slurry to a pH of about 1.4. After 1.5 hours of aging, the acidic slurry was spray dried at about 400° C. and washed in aqueous sulfuric acid having a pH of about 3.0 at about 60° C. Washing was complete after about 10 minutes. After oven drying at about 200° C. the resulting silica gel had the following properties:

| | |
|---|---|
| Average particle size | 45 microns |
| Surface area | 780 m²/g. |
| Port volume | 0.37 cc/g. |
| $Na_2O$ | 0.023% |
| $SO_4$ | 0.22% |

The water adsorption of the above-prepared gel was as follows:

| % Relative Humidity | % Moisture Adsorbed |
|---|---|
| 10 | 7.63 |
| 20 | 13.64 |
| 40 | 24.37 |
| 60 | 31.68 |
| 80 | 37.44 |

EXAMPLE III

Particle size analysis of the silica gel prepared in example II is as follows:

| Sizes measured (microns) | Weight Percent |
|---|---|
| 0–20 | 7 |
| 20–40 | 29 |
| 40–80 | 47 |
| 80–105 | 13 |
| 105 | 4 |

The instant invention as hereinbefore described produces highly adsorptive silica gel of very fine particles size. It completely eliminates several costly, time-consuming steps inherent to prior art processes. Not only has this invention precluded the difficult grinding and sizing operations previously required, but has also drastically reduced the time required to wash the entrapped salts from the silica gel. Prior art methods require up to 36 hours of washing with pH 3.0 sulfuric acid at 60° C. to achieve the same degree of salt removal achieved by the instant invention in only about 10 minutes.

We claim:
1. A process for preparing fine sized silica gel, said process comprising:
   a. Reacting an aqueous solution of alkali metal silicate and an aqueous solution of mineral acid to form a silica hydrosol having a pH of about 9.6–10.9;
   b. Permitting said hydrosol to gel and agitating said hydrogel to form an alkaline slurry of soft, fine-sized silica gel particles;
   c. Reacting said alkaline slurry and an aqueous solution of mineral acid to obtain an acidic silica hydrogel slurry having a pH of about 0.5–3.0;
   d. Rapidly drying said acidic silica gel slurry in less than about 3 minutes to obtain dried silica gel particles having a particle size of about 10–80 microns; and
   e. Recovering said dried silica gel particles.
2. The process of claim 1 wherein said aqueous solution of alkali metal silicate contains about 5–22 percent silica by weight.
3. The process of claim 2 wherein said alkali metal silicate is sodium silicate.
4. The process of claim 3 wherein said acidic silica slurry is dried in about 1–5 seconds.